(12) United States Patent
Smolik

(10) Patent No.: US 6,381,455 B1
(45) Date of Patent: Apr. 30, 2002

(54) SYSTEM AND METHOD FOR WARNING OF AND PROVIDING GREATER IMMUNITY FROM AN IMPEDING CALL DROP IN A DIGITAL WIRELESS SYSTEM

(75) Inventor: Kenneth Frank Smolik, Naperville, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/173,349

(22) Filed: Oct. 15, 1998

(51) Int. Cl.[7] ............................................. H04Q 7/32
(52) U.S. Cl. ...................... 455/421; 370/230; 455/522; 375/225
(58) Field of Search ........................... 455/421, 422, 455/428, 433, 439, 6.3, 63, 501, 434, 561, 522, 67.1, 67.3; 370/465, 332, 331, 333, 346, 341, 344, 347, 230, 350, 241, 229; 375/224, 225; 371/225, 3, 5.1, 30, 32, 37.7, 37.9, 45, 48, 5.5

(56) References Cited

U.S. PATENT DOCUMENTS

| | | | | |
|---|---|---|---|---|
| 4,047,151 A | * | 9/1977 | Rydbeck et al. | 340/146.1 |
| 4,943,985 A | * | 7/1990 | Gherardi | 375/111 |
| 5,200,962 A | * | 4/1993 | Kao et al. | 371/41 |
| 5,228,030 A | * | 7/1993 | Dresher | 370/464 |
| 5,491,687 A | * | 2/1996 | Christensen et al. | 370/253 |
| 5,509,020 A | * | 4/1996 | Iwakiri et al. | 371/43 |
| 5,673,266 A | * | 9/1997 | Li | 370/465 |
| 5,689,511 A | * | 11/1997 | Shimazaki et al. | 370/545 |
| 5,699,365 A | * | 12/1997 | Klayman et al. | 371/5.5 |
| 5,734,646 A | * | 3/1998 | I et al. | 370/335 |
| 5,796,757 A | * | 8/1998 | Czaja | 371/46 |
| 5,802,105 A | * | 9/1998 | Tiedemann, Jr. et al. | 375/225 |
| 5,812,545 A | * | 9/1998 | Liebowitz et al. | 370/337 |
| 5,825,761 A | * | 10/1998 | Tanaka et al. | 370/333 |
| 5,828,672 A | * | 10/1998 | Labone et al. | 371/5.5 |
| 5,892,802 A | * | 4/1999 | Jung et al. | 375/345 |
| 5,953,331 A | * | 9/1999 | Duncan et al. | 370/332 |
| 5,991,627 A | * | 11/1999 | Honkasalo et al. | 455/437 |
| 6,028,892 A | * | 2/2000 | Barabash et al. | 375/222 |
| 6,118,983 A | * | 9/2000 | Egusa et al. | 455/69 |
| 6,151,508 A | * | 11/2000 | Kim et al. | 455/522 |

OTHER PUBLICATIONS

S. Lin and D. Costello, "Error Control Coding Fundamentals and Applications," 1983, pp. 1, 2, 95, 96, 103–106, 116, 142, 143, 585, 586.

* cited by examiner

Primary Examiner—William Trost
Assistant Examiner—Congvan Tran
(74) Attorney, Agent, or Firm—Walter W. Duft

(57) ABSTRACT

A system and method are disclosed for providing a warning of, and greater immunity from, an impending call drop in a digital wireless telecommunications system. During normal operations, data is transmitted at an initial information frame rate and a corresponding initial physical frame rate. Upon the data transmission producing errors in excess of a threshold, which indicates an impending call drop, the initial information frame rate is reduced while error correction codes are introduced into the data transmission to maintain the initial physical frame rate. The reduction in the information frame rate produces a subtle yet noticeable change in acoustic voice quality, which serves as a warning of the impending call drop. The introduction of error correction codes into the transmission provides greater immunity to the impending call drop by improving data integrity.

22 Claims, 5 Drawing Sheets

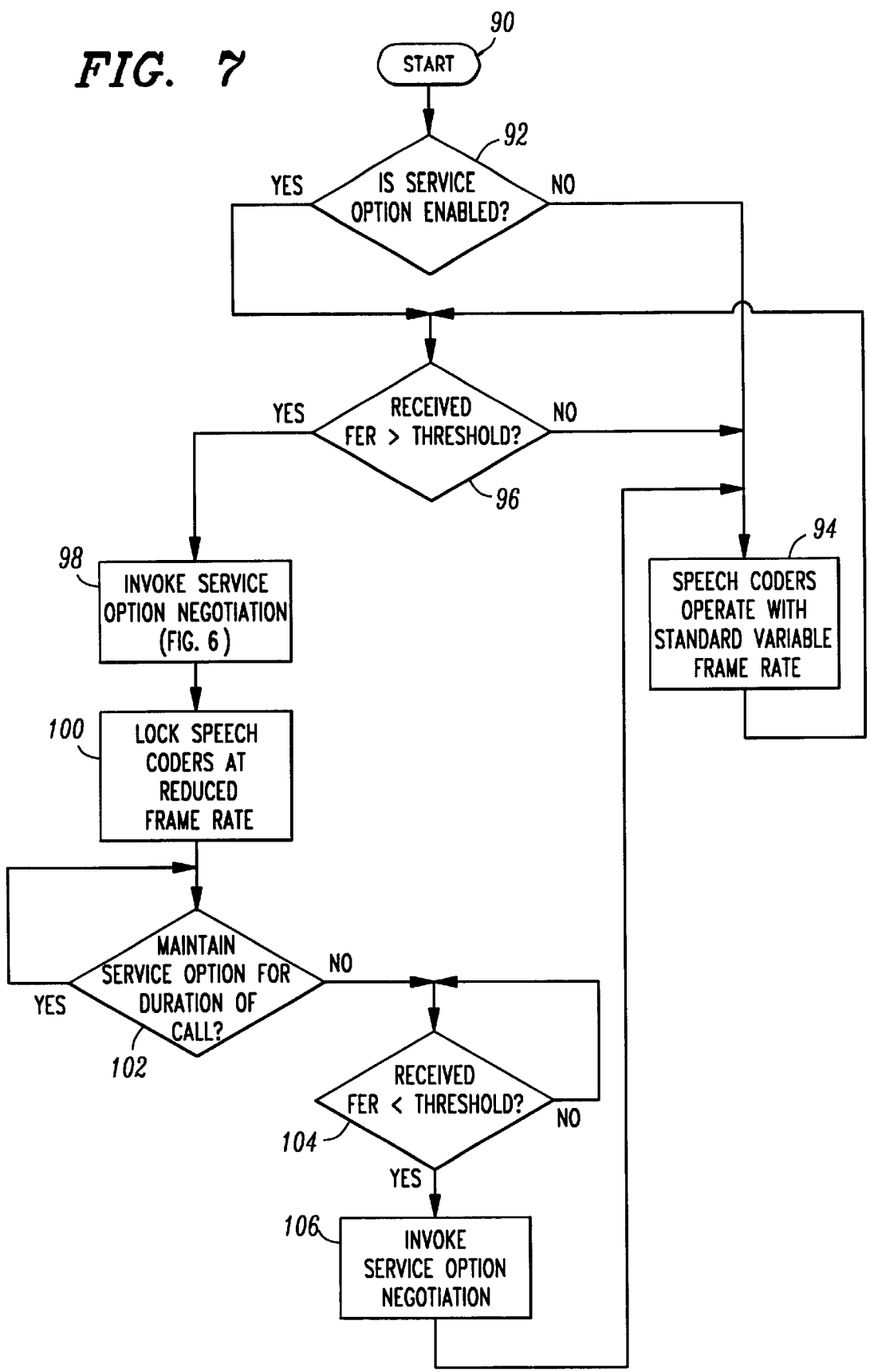

SYSTEM AND METHOD FOR WARNING OF AND PROVIDING GREATER IMMUNITY FROM AN IMPEDING CALL DROP IN A DIGITAL WIRELESS SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to digital wireless telecommunications systems. More particularly, the invention relates to a system and method for warning of, and providing greater immunity from, an impeding call drop in a digital cellular telephone system, personal communication service (PCS) network, or equivalent enterprise employing variable frame rate data transmission.

2. Description of the Prior Art

In analog wireless service networks, such as Advanced Mobile Phone Service (AMPS) systems, a mobile subscriber can anticipate that a call may be dropped (abruptly terminated while conversing) if the subscriber hears static superimposed upon speech. This can occur when the mobile unit traverses the boundary of RF coverage.

In digital wireless telecommunications systems, such as CDMA and TDMA cellular telephone networks, the subscriber does not experience impending call drop static. Up until the instant the call is dropped, the voice quality is clear, and then the call terminates abruptly. This unexpected dropping is not desirable.

Various prior art proposals have been made to generate an audible tone that serves as an impending call drop warning. Rather than using annoying tone signals, however, it would be preferable if a more subtle call drop warning could be provided to the subscriber. It would be further advantageous if this warning could be implemented with a technique for delaying or even avoiding the impending call drop so as to provide increased call drop immunity.

BRIEF SUMMARY OF THE INVENTION

The foregoing problem is solved by the system and method of the present invention, which provides a warning of, and greater immunity from, an impeding call drop in a digital wireless telecommunications system. During normal operations, data is transmitted in the telecommunications system at an initial information frame rate and a corresponding initial physical frame rate. Upon the data transmission producing errors in excess of a threshold, which is indicative of an impending call drop, the initial information frame rate is reduced while error correction codes are introduced into the data transmission to maintain the initial physical frame rate. The reduction in the information frame rate produces a subtle yet noticeable change in acoustic voice quality, which serves as a warning of the impending call drop. The introduction of error correction codes into the transmission provides greater immunity to the impending call drop by improving data integrity.

Typically, the wireless telecommunications system includes a Mobile Switching Center (MSC) coupled to at least one radio base station servicing at least one mobile radio unit. The base station and the mobile unit communicate with each other in a digital transmission mode wherein voice data is digitally encoded by voice encoder/decoders (vocoders) located in the MSC (or the base station) and the mobile unit as a sequence of variable rate information frames. The information frames are packaged by physical layers (which may be implemented as part of the vocoders) into a sequence of physical transmission frames that include the information frames with appended and/or prepended control and error checking bits.

In preferred embodiments of the invention, the telecommunications system is programmed to monitor normal transmissions between the base station and the mobile unit for frame errors. During such normal transmissions, the vocoders encode voice data at an initial information frame rate and the physical layers receive the initial rate information frames from the voice encoders and construct physical transmission frames at an initial physical frame rate corresponding to the initial information frame rate.

When a call drop is impending, the number of frame errors increases. When it reaches a predetermined threshold, the telecommunications system controls the vocoders to reduce the information frame rate from the initial information frame rate to a reduced information frame rate, such that reduced rate information frames are provided to the physical layers. The telecommunications system then controls the physical layers to add error correction bits to the reduced rate information frames to transmit error correction enhanced physical transmission frames at the initial physical frame rate.

The error correction enhanced physical transmission frames produce a characteristic change in speech quality due to the reduced information frame rate. This change in speech quality provides a subtle but effective call drop warning. Preferably, the reduced rate information frame carries no more than half the information of the initial information frame.

The error correction enhanced physical transmission frames also provide increased error correction robustness for greater immunity from the impending call drop. To that end, the difference between the initial information frame rate and the reduced information frame rate is selected to accommodate sufficient error correction bits to achieve a predetermined number of correctable errors per frame. Preferably, these additional error correcting bits constitute a cyclic error control code, and most preferably, a shortened BCH cyclic code. The error control code is selected so as to correct a predetermined number of correctable errors in a frame that is the same size as the initial information frame.

By way of example, assume the initial information frame has n information bits and the reduced information frame is selected to have k information bits. The error correction enhanced physical transmission frame will be capable of carrying n–k additional error correction bits representing a shortened cyclic error control code capable of correcting t errors in a frame of size $n' \geq n$ and $k' \geq k$, where n' is the correctable frame size and k' is the number of correctable frame information bits 7. In the event fewer than n–k additional error correction bits are required to correct t errors in a frame of size $n' \geq n$ and $k' \geq k$, the error correction enhanced physical transmission frame is constructed to include additional place holder bits.

The invention may be implemented without returning to the normal transmission mode until a call is terminated. Alternatively, the initial information frame rate could be resumed in the event the number of frame errors falls below the predetermined threshold.

BRIEF DESCRIPTION OF THE SEVERAL VIEWS OF THE DRAWING

The foregoing and other features and advantages of the invention will be apparent from the following more particular description of a preferred embodiment of the invention, as illustrated in the accompanying Drawing, in which:

FIG. 7 is a flow diagram illustrating method steps performed by the telecommunications system of FIG. 1 in accordance with the present invention.

DETAILED DESCRIPTION OF THE INVENTION

Figure 1:
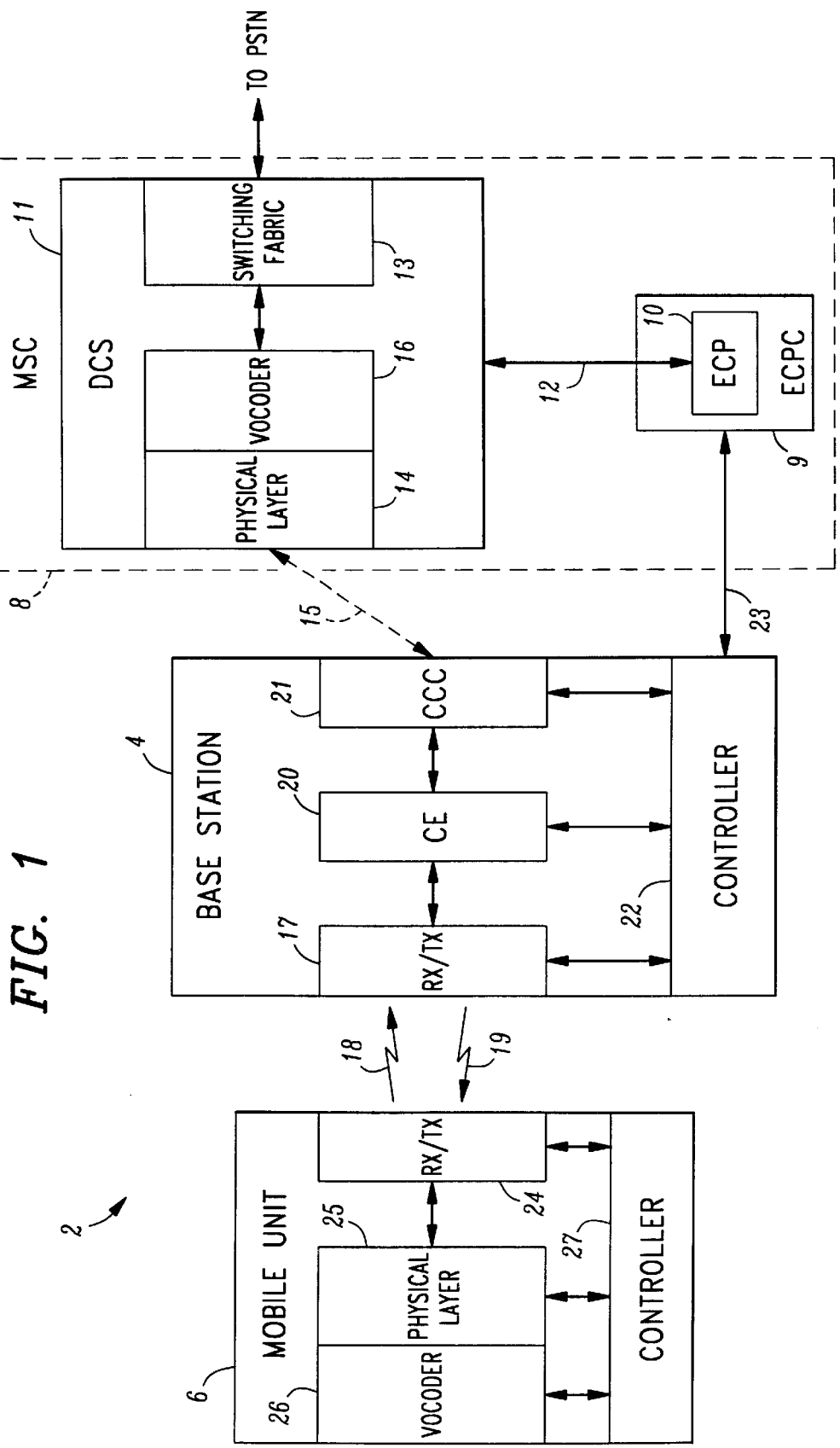
FIG. 1 is a block diagram of a wireless telecommunications system constructed in accordance with the present invention.

Turning now to the Drawing, wherein like reference numbers designate like elements in all of the several views, FIG. 1, illustrates a digital wireless telecommunications system 2 constructed in accordance with a preferred embodiment of the invention. The telecommunications system 2 can be any digital cellular telephone system, PCS network, or equivalent, that has the capability of employing variable frame rate data transmission, including systems utilizing the CDMA and TDMA air interface protocols. The following discussion assumes, by way of example only, that the telecommunications system 2 is a CDMA cellular telephone network.

The telecommunications system 2 includes at least one radio base station 4 servicing at least one mobile radio unit 6 within a bounded geographic service area that is commonly referred to as a "cell." Typically, there would be many bases stations 4 servicing multiple mobile units 6.

A Mobile Switching Center 8 (MSC) controls the operations of the system 2. It includes an Executive Cellular Processing Complex (ECPC) 9 containing plural data processing devices, including an Executive Cellular Processor (ECP) 10. The MSC 8 also includes at least one Digital Cellular Switch (DCS) 11 that connects to the ECPC through a DCS/ECP interface 12. The DCS routes call traffic received from the base station 4 via a switching fabric layer 13 to a land-based telecommunications system, such as the Public Switched Telephone Network (PSTN). A physical layer 14 interfaces with the base station 4 via a packet pipe 15 that carries speech data packets in a broadband mode. The physical layer 14 constructs and deconstructs the physical data frames that are carried in the packet pipe 15. A speech encoder/decoder (vocoder) 16 constructs and deconstructs information frames containing speech data that are utilized by the physical layer 14 to construct the physical transmission frames. It should be understood that the vocoder 16 and the physical layer 14 could be integrated into a single hardware unit that logically performs the vocoder and physical layer functions, or could be configured as separate hardware units. Use of the separate terms "vocoder" and "physical layer" hereinafter is not intended to signify the separate hardware implementation, but will be understood as also including the single hardware unit embodiment that performs both of the vocoder and physical layer logical functions. It should also be understood that the physical layer 14 and the vocoder 16 could be incorporated into the base station 4, rather than the MSC 8, if so desired.

The base station includes a Receive/Transmit (RX/TX) unit 17 that receives reverse radio channel signals 18 from the mobile unit 6 and transmits forward radio channel signals 19 to the mobile unit 6. The RX/TX unit 17 is also a baseband/narrowband converter. It transmits and receives narrow band signals to and from the mobile unit 6. These narrow band signals are converted to and from baseband signals that the RX/TX unit 17 exchanges with a Channel Element (CE) unit 20, which performs baseband signal processing. A Channel Cluster Controller (CCC) 21 provides an interface between the CE unit 20 (and other CE units) and the packet pipe 15. A controller 22 controls the operations of the RX/TX unit 17, the CE unit(s) 20, and the CCC 21. It maintains a data link 23 to the ECPC 9, which the ECPC 9 uses to control the base station 4 to set up and maintain a call.

The mobile unit 6 includes an RX/TX unit 24 that acts as a counterpart to the base station RX/TX unit 17. A physical layer 25 constructs and deconstructs physical data frames that are utilized by the RX/TX unit 24. A speech encoder/decoder (vocoder) 26 constructs and deconstructs information frames containing speech data that are utilized by the physical layer 25 to construct the physical transmission frames. Again, the physical layer 25 and the vocoder 26 could be implemented as logical functions performed by a single hardware unit or as separate hardware units, and the use of the separate terms "vocoder" and "physical layer" is not intended to signify the separate hardware implementation to the exclusion of the integrated implementation. A programmed controller 27 manages the operations of the mobile unit 6, including the RX/TX unit 24, the physical layer 25 and the vocoder 26.

The base station and the mobile unit communicate with each other in a digital transmission mode wherein voice data is digitally encoded by the vocoders 16 and 26 located in the MSC 8 (or the base station 4) and the mobile unit 6, respectively. The voice data is encoded as a sequence of variable rate information frames. These information frames are then packaged by the physical layers 14 and 25 located in the MSC 8 (or the base station 4) and the mobile unit 6, respectively, into physical transmission frames that include the information frames with appended and/or prepended control and error checking bits.

Figure 2:
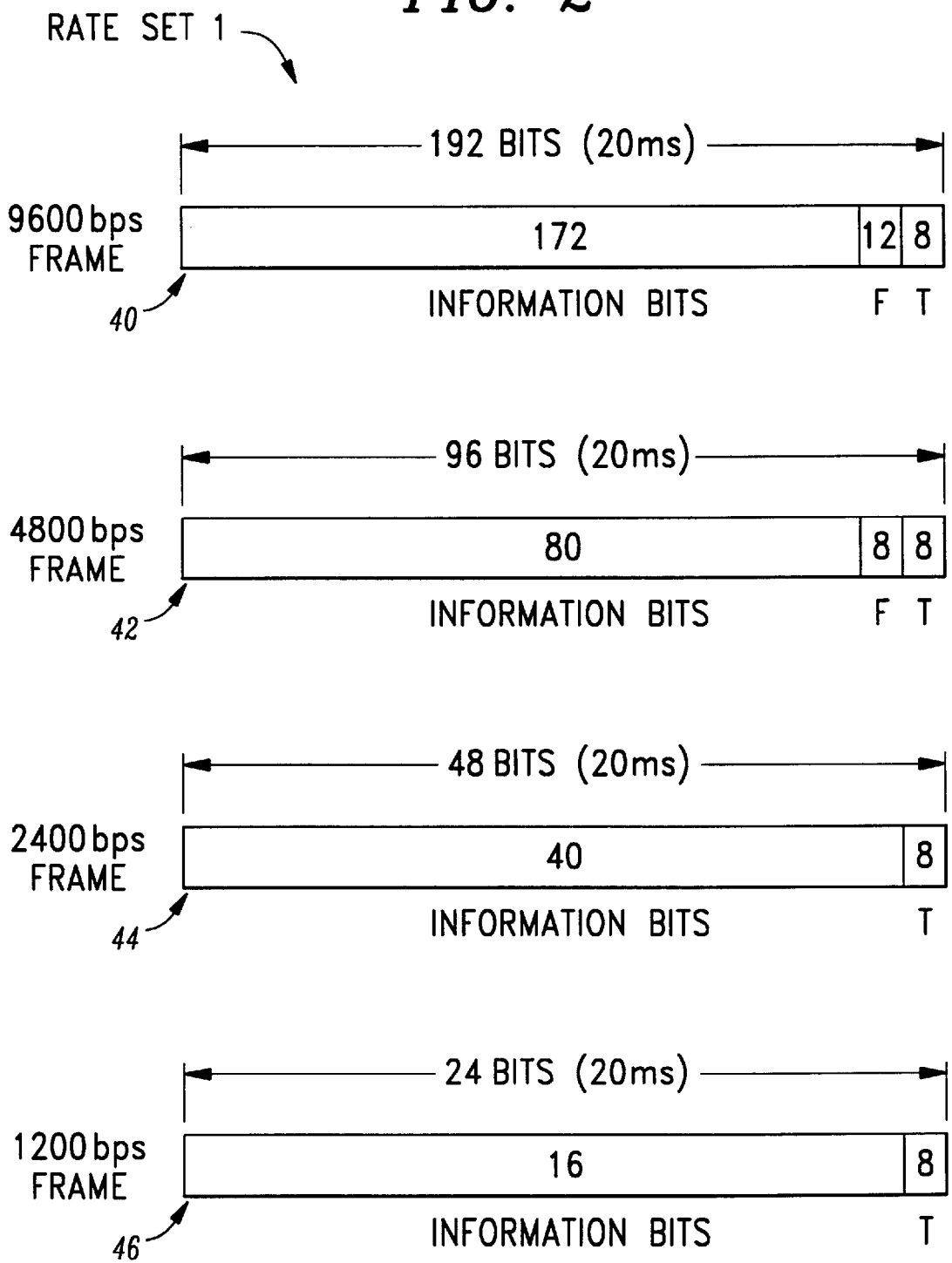
FIG. 2 is a block diagram showing a first rate set (Rate Set 1) of standard physical transmission frames used for transmitting data in the telecommunications system of FIG. 1.
Figure 3:
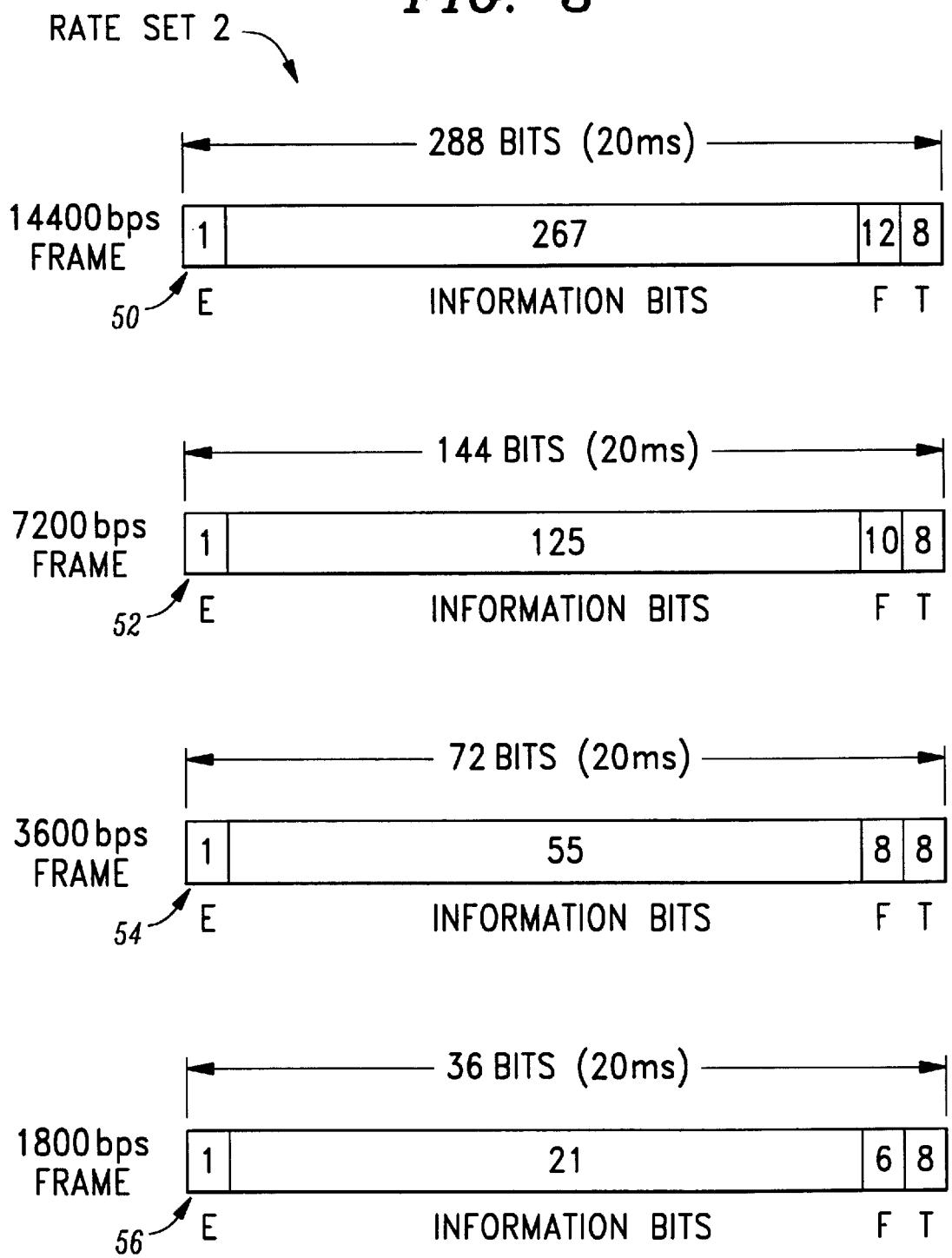
FIG. 3 is a block diagram showing a second rate set (Rate Set 2) of standard physical transmission frames used for transmitting data in the telecommunications system of FIG. 1.

FIG. 2 illustrates a first rate set (Rate Set 1) of physical transmission frames and FIG. 3 illustrates a second rate set (Rate Set 2) of physical transmission frames constructed by the physical layers 14 and 25. By way of example, the frames are each 20 milliseconds long but vary in the amount of information and control bits they carry. FIG. 2 shows that Rate Set 1 includes a full rate frame 40 carrying 9600 bits per second (bps), a half rate frame 42 carrying 4800 bps, a quarter rate frame 44 carrying 2400 bps, and an eighth rate frame 46 carrying 1200 bps. FIG. 3 shows that Rate Set 2 includes a full rate frame 50 carrying 14400 bps, a half rate frame 52 carrying 7200 bps, a quarter rate frame 54 carrying 3600 bps, and an eighth rate frame 56 carrying 1800 bps.

By varying the frame rate, the telecommunications system 2 is able to adjust channel capacity to support changes in the number of mobile units 6 handled by the base station 4. The vocoders 16 and 26 automatically adjust the frame rate based upon input voice characteristic information, as is known in the art. As is also known, the procedure for adjusting the frame rate can be modified by negotiating a "service option" between the base station 4 and the mobile unit 6 in a procedure known as "service option negotiation." The control computer 20 in the base station 4 includes a state machine that manages service option negotiations on behalf of the base station 4. The controller 46 negotiates on behalf of the mobile unit 6. Logic within the physical layers 14 and 25, and within the vocoders 16 and 26, implements the agreed-upon service option at the base station 4 and mobile unit 6, respectively.

As seen in FIGS. 2 and 3, each physical transmission frame includes a number of information bits representing an information frame constructed by the vocoders 16 and 26. In the full rate and half rate frames of Rate Set 1, and in all of the frames of Rate Set 2, the information frame is appended with a Frame Quality Indicator area "F" containing error checking bits, such as a cyclic redundancy check (CRC) frame check sequence (FCS). Each frame in Rate Set 1 and Rate Set 2 is also appended with encoder tail bits "T." Each frame in Rate Set 2 is prepended with an erasure indicator bit "E."

FIGS. 2 and 3 illustrate that the number of information bits transmitted in a physical transmission frame decreases with the frame rate, as does the transmitted energy per frame. Tables 1 and 2 summarize these relationships:

TABLE 1

TRANSMITTED ENERGY PER FRAME

| FRAME RATE | TRANSMITTED ENERGY |
| --- | --- |
| FULL | E |
| HALF | 1/2*E |
| QUARTER | 1/4*E |
| EIGHTH | 1/8*E |

INFORMATION BITS PER FRAME (TABLE 2)

| FRAME RATE | RATE SET 1 | RATE SET 2 |
| --- | --- | --- |
| FULL | 172 | 267 |
| HALF | 80 | 125 |
| QUARTER | 40 | 55 |
| EIGHTH | 16 | 21 |

In accordance with the present invention, a new service option is provided that produces a subtle change in voice quality which alerts the mobile subscriber that a call may be dropped because the mobile unit 6 is in a fringe area such as a cell boundary or RF coverage hole. At the same time, the new service option implements increased robustness in the base station-mobile unit communications channel to provide enhanced call drop immunity.

The controller 22 and the CE unit 20 at the base station 4 monitor normal variable frame rate transmissions (i.e., before the new service option is invoked) between the base station 4 and the mobile unit 6 for frame errors. During such normal transmissions, the vocoders 16 and 26 encode voice data at an initial information frame rate and the physical layers 14 and 25 receive the initial rate information frames from the voice encoders and construct physical transmission frames at an initial physical frame rate corresponding to the initial information frame rate. Assume for example, that the physical layers 14 and 25 are initially transmitting physical transmission frames at a full frame rate incorporating 172 information bits under Rate Set 1 or 267 information bits under Rate Set 2.

When a call drop is impending, the number of frame errors increases as the signal quality decreases. When the number of frame errors reaches a predetermined threshold (provided by the ECPC 9), the new service option is negotiated and the vocoders 16 and 26 are locked at a reduced information frame rate relative to the initial information frame rate. In the preferred embodiment of the invention, the vocoders 16 and 26 are locked in the half-rate mode. Significantly, when the reduced rate information frames are provided to the physical layers 14 and 25, they do not reduce the physical frame rate in accordance with the reduced information frame rate. Rather, the physical layers 14 and 25 maintain the original physical frame rate. To pad the missing bits of the physical transmission frames, the physical layers 14 and 25 append error correction bits to the reduced rate information frames and construct error correction enhanced physical transmission frames utilizing the initial physical frame rate.

Figure 4:
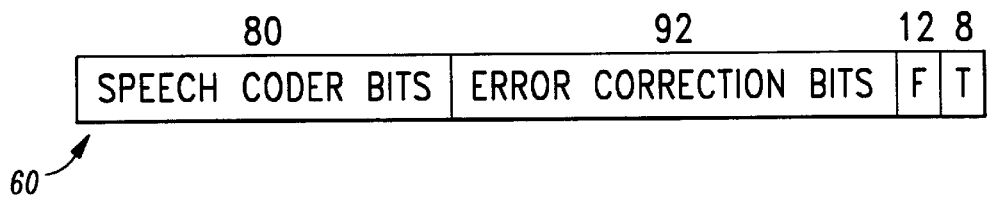
FIG. 4 is a block diagram showing an error correction enhanced physical transmission frame constructed in accordance with the present invention from a full frame rate physical transmission frame of the first rate set shown in FIG. 2.
Figure 5:
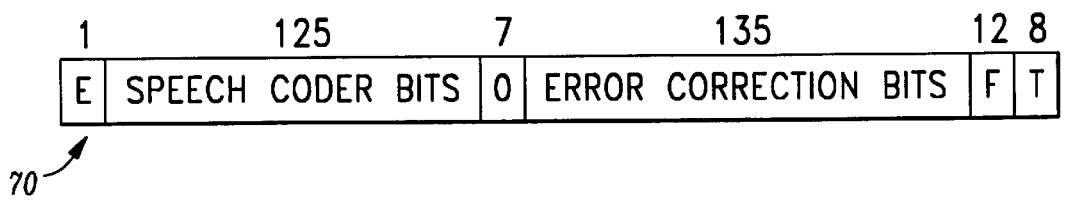
FIG. 5 is a block diagram showing an error correction enhanced physical transmission frame constructed in accordance with the present invention from a full frame rate physical transmission frame of the second rate set shown in FIG. 3.

FIGS. 4 and 5 illustrate error correction enhanced physical transmission frames 60 and 70 corresponding to Rate Set 1 and Rate Set 2, respectively. Frame 60 has 80 information or "speech coder bits" corresponding to the half rate frame 42 shown in Rate Set 1 of FIG. 2. However, Frame 60 is 192 bits long in accordance with the full rate frame 40 shown in Rate Set 1 of FIG. 2. Frame 70 has 125 information or "speech coder bits" corresponding to the half rate frame 52 shown in Rate Set 2 of FIG. 3. However, Frame 70 is 288 bits long in accordance with the full rate frame 50 shown in Rate Set 2 of FIG. 3.

The error correction enhanced physical transmission frames 60 and 70 produce a characteristic change in speech quality due to the reduced information frame rate. This change in speech quality serves as a subtle but effective call drop warning. For best results, the reduced rate information frame does not carry more than one-half the information of the initial information frame. For example, if the information frame is initially a full rate frame, it is reduced to a half rate frame, and so on.

The frames 60 and 70 also provide increased error correction robustness for greater call drop immunity. To that end, the difference between the initial information frame rate and the reduced information frame rate is selected to accommodate sufficient error correction bits to achieve a predetermined number of correctable errors per frame. Preferably, the additional error correcting bits constitute a cyclic error control code, and most preferably, a shortened BCH cyclic code, with the cyclic encoding and decoding being performed by the physical layers 14 and 25 using the usual circuitry associated with such computations.

The error control code is selected so as to correct a predetermined number of correctable errors in a frame that is the same size as the initial information frame. By way of example, assume the initial information frame (e.g., the one generated without vocoder locking) has n information bits and the reduced information frame is selected to have k information bits. The error correction enhanced physical transmission frame (e.g., 60 or 70) will be capable of carrying n−k error correction bits representing a shortened cyclic error control code capable of correcting t errors in a frame of size n'≧n and k'≧k, where n' is the correctable frame size and k' is the number of correctable frame information bits. In the event that fewer than n−k error correction bits are required to correct t errors in a frame of size n'≧n and k'≧k, the error correction enhanced physical transmission frame (e.g. 60 or 70) is constructed to include additional place holder pad bits. As shown in FIG. 5, there are 7 such pad bits in the error correction enhanced physical transmission frame 70, which was constructed by adding a shortened BCH control code of 135 bits. Table 3 below provides an example of how to determine the required number of error correction bits using, by way of example, full rate physical transmission frames enhanced with a shortened BCH control code:

| METHOD FOR DETERMINING NUMBER OF ERROR CONTROL BITS | | | | | |
| --- | --- | --- | --- | --- | --- |
| Rate Set | n | k | n − k | Shortened n | Shortened k | t |
| 1 | 172 | 80 | 92 | 255 | 163 | 12 |
| 2 | 267 | 125 | 142 | 311 | 376 | 15 |

The "Shortened n" and "Shortened k" table entries are the actual frame size and number of information bits, respectively, that can be corrected (up to a maximum of "t" errors) if a shortened cyclic code of not more than "n−k" bits is employed in accordance with shortened BCH control code theory. A convenient look up table of "shortened n," "shortened k," and "t" values, as well as the polynomials that can be used to generate the control code values inserted in the error correction enhanced physical transmission frames of the present invention, is set forth in "Error Control Coding Fundamentals and Applications, by Shu Lin and Daniel J. Costello, Jr., Prentice-Hall, Inc. (1983) at pages 585–586.

The Lin-Costello look-up table shows that the generator polynomial "750 041 551 007 560 255 157 472 451 460 1" (where each digit represents 3 bits using octal representation) can be used to generate a 92 bit shortened BCH code that corrects t=12 erroneous bits in a frame of size shortened n=255, having shortened k=163 information bits. By coincidence, this 92 bit shortened BCH code perfectly matches the n−k=92 bit positions available in the error correction enhanced physical transmission frame 60. The shortened n=255 and the shortened k=163 values are more than sufficient to handle the original information frame size of n=172 and the reduced information frame size of k=80.

The Lin-Costello look-up table shows that the generator polynomial "111 674 470 652 172 553 222 716 260 714 621 621 010 673 320 3" can be used to generate a 135 bit shortened BCH code that corrects t=15 erroneous bits in a frame of size shortened n=511, having shortened k=376 information bits. This 135 bit shortened BCH code, however, is 7 bits less than n−k=142 bit positions available in the error correction enhanced physical transmission frame 70. Thus, frame 70 includes the 7 pad bits shown in FIG. 5. The shortened n=511 and the shortened k=376 values are more than sufficient to handle the original information frame size of n=267 and the reduced information frame size of k=125.

Figure 6:
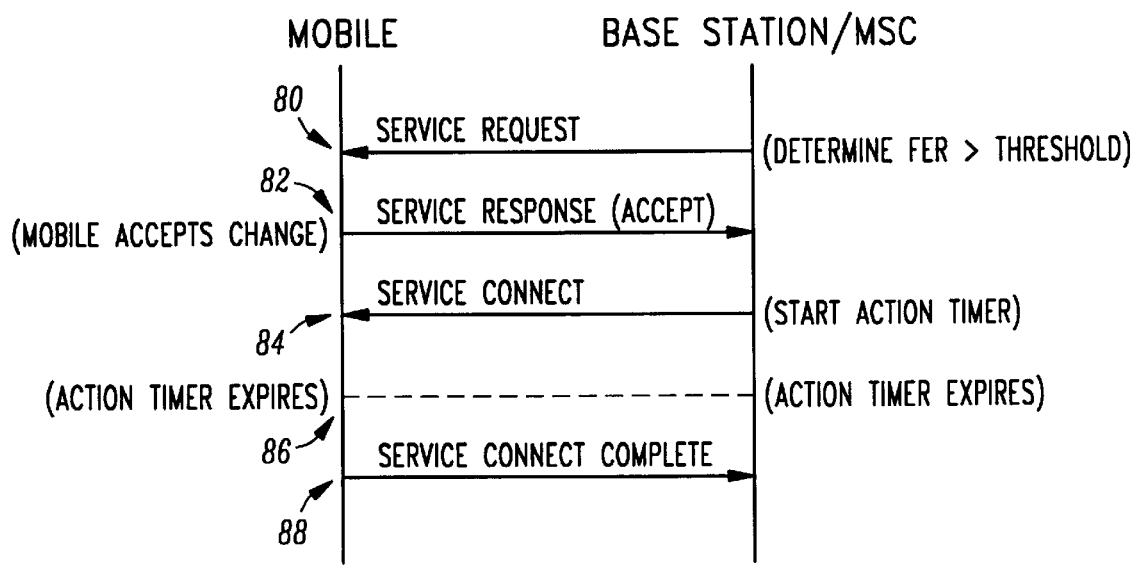
FIG. 6 is a sequence diagram showing a service option negotiation between a mobile unit and a base station (or a Mobile Switching Center) in accordance with the present invention.

FIG. 6 illustrates the process by which the new service option of the present invention is negotiated. Initially, the base station 4, having determined via its controller 22 that the Frame Error Rate (FER) exceeds some threshold (provided by the ECPC 9), causes a service request to be sent to the mobile unit 6 at 80. The mobile unit 6 responds at 82 by either accepting or denying the service request. Assuming the mobile unit 6 accepts the service request, the base station 4 causes a service connection sequence to be invoked at 84 and commences an action timer. After the action timer expires at 86, the mobile unit 6 signals at 88 that the service connection is complete.

The invention may be implemented such that the telecommunications system 2 does not return to the normal transmission mode once the new service option has been implemented. Alternatively, the initial variable frame rate service option could be resumed in the event the number of frame errors falls below the predetermined threshold. This alternative is illustrated in FIG. 7, which shows the method steps performed by the controller 22 in the base station 4, in conjunction with the MSC 8, in accordance with the invention.

Beginning at 90, the controller 22 determines in step 92 whether the service provider that operates the telecommunications system 2 has subscribed to the new service option of the present invention. If the provider has not, then the base station 4 sends control signals to MSC 8 and the mobile unit 6 in step 94 to operate the vocoders 16 and 26 according to a standard variable frame rate. If step 92 produces a true result, indicating the new service option has been enabled, the base station 4 begins checking the frame errors against a threshold in step 96. If the errors do not exceed the threshold, the process proceeds to step 94 for normal variable rate frame transmission. If the error threshold is found to be exceeded in step 96, negotiation for the new service option is invoked in step 98 in accordance with FIG. 6. Following a successful service option negotiation in step 98, the base station 4 sends control signals to the MSC 8 and the mobile unit 6 to lock the vocoders 16 and 26 at a reduced information frame rate in step 100. In step 102, a test is made to determine whether the new service option is to remain in effect for the duration of the call. If it is, the process loops through step 102 until the call is completed. If the new service option is not configured to remain in effect throughout a call in step 102, the process begins testing the frame errors in step 104 to determine if they fall below the threshold. The process continues testing in step 104 until the frame errors fall below the threshold, at which point service option negotiation is invoked in step 106 to return to the original variable frame rate mode. Once negotiation is complete, the process returns to step 94 and operates under the standard variable frame rate service option.

Accordingly, a system and method for providing warning of, and greater immunity from, an impending call drop in a variable frame rate digital wireless system has been described. While various embodiments have been disclosed, it should be apparent that many variations and alternative embodiments would be apparent to those skilled in the art in view of the teachings herein. For example, if available processing power is limited, the number of error correction code bits could be reduced (by utilizing a smaller error correction code), in which case pad bits would be inserted to fill out the error correction enhanced physical transmission frames. It is understood, therefore, that the invention is not to be in any way limited except in accordance with the spirit of the appended claims and their equivalents.

What is claimed is:

1. In a wireless telecommunications system including a Mobile Switching Center (MSC) connected to at least one radio base station that services at least one mobile radio unit, said base station and said mobile unit communicating with each other in a digital transmission mode wherein voice data is digitally encoded by voice encoders located in said MSC (or said base station) and said mobile unit as a sequence of variable rate information frames, said information frames being packaged by physical layers located in said MSC (or said base station) and said mobile unit into a sequence of physical transmission frames that include said information frames with appended control and error checking bits, a method for warning a user of, and providing greater immunity from, an impending call drop, comprising the steps of:

monitoring transmissions between said base station and said mobile unit for frame errors while said voice encoders are encoding voice data at an initial information frame rate and said physical layers are receiving initial rate information frames from said voice encoders and transmitting physical transmission frames at an initial physical frame rate corresponding to said initial information frame rate;

upon the number of said frame errors reaching a predetermined threshold, controlling said voice encoders to reduce the information frame rate from said initial information frame rate to a reduced information frame rate such that reduced rate information frames are provided to said physical layers;

controlling said physical layers to add error correction bits to said reduced rate information frames to transmit error correction enhanced physical transmission frames at said initial physical frame rate; and whereby said error correction enhanced physical transmission frames provide increased error correction robustness for greater immunity from call dropping, and result in a characteristic change in speech quality due to said reduced rate information frame being incorporated therein to serve as an impending call drop warning.

2. A method in accordance with claim 1 wherein the difference between said initial information frame rate and said reduced information frame rate is selected to accommodate sufficient error correction bits to achieve a predetermined number of correctable errors per frame.

3. A method in accordance with claim 2 wherein said additional error correction bits constitute a cyclic error control code.

4. A method in accordance with claim 3 wherein said cyclic error control code is a shortened cyclic code.

5. A method in accordance with claim 4 wherein said reduced information frame rate is selected to accommodate the insertion of a shortened cyclic error control code in said error correction enhanced physical transmission frame that is sufficient to achieve a predetermined number of correctable errors in a frame that is the same size as said initial information frame.

6. A method in accordance with claim 1 wherein said initial information frame has n information bits, and wherein said reduced information frame is selected to have k information bits such that said error correction enhanced physical transmission frame is capable of carrying n−k additional error correction bits representing a shortened cyclic error control code capable of correcting t errors in a frame of size n'≧n and k'≧k, where n' is the correctable frame size and k' is the number of correctable frame information bits.

7. A method in accordance with claim 6 wherein said error correction enhanced physical transmission frame includes additional place holder bits in the event that fewer than n−k additional error correction bits are required to correct t errors in a frame of size n'≧n and k'≧k.

8. A method in accordance with claim 7 wherein said error correction code is a shortened BCH code.

9. A method in accordance with claim 1 wherein said reduced rate information frame carries not more than one-half the information of said initial information frame.

10. A method in accordance with claim 1 further including the step of resumning said initial information frame rate in the event the number of said frame errors falls below said predetermined threshold.

11. In a wireless telecommunications system including a Mobile Switching Center (MSC) connected to at least one radio base station that services at least one mobile radio unit, said base station and said mobile unit communicating with each other in a digital transmission mode wherein voice data is digitally encoded by voice encoders located in said MSC (or said base station) and said mobile unit as a sequence of variable rate information frames, said information frames being packaged by physical layers located in said MSC (or said base station) and said mobile unit into a sequence of physical transmission frames that include said information frames with appended control and error checking bits, a system for warning a user of, and providing greater immunity from, an impending call drop, comprising:

means in said base station for monitoring transmissions between said base station and said mobile unit for frame errors while said voice encoders are encoding voice data at an initial information frame rate and said physical layers are receiving initial rate information frames from said voice encoders and transmitting physical transmission frames at an initial physical frame rate corresponding to said initial information frame rate;

means in said base station and said mobile unit responsive to the number of said frame errors reaching a predetermined threshold for controlling said voice encoders to reduce the information frame rate from said initial information frame rate to a reduced information frame rate such that reduced rate information frames are provided to said physical layers;

means in said base station and said mobile unit for controlling said physical layers to add error correction bits to said reduced rate information frames to transmit error correction enhanced physical transmission frames at said initial physical frame rate; and whereby said error correction enhanced physical transmission frames provide increased error correction robustness for greater immunity from call dropping, and result in a characteristic change in speech quality due to said reduced rate information frame being incorporated therein to serve as an impending call drop warning.

12. A system in accordance with claim 11 wherein the difference between said initial information frame rate and said reduced information frame rate is selected to accommodate sufficient error correction bits to achieve a predetermined number of correctable errors per frame.

13. A system in accordance with claim 12 wherein said additional error correction bits constitute a cyclic error control code.

14. A system in accordance with claim 13 wherein said cyclic error control code is a shortened cyclic code.

15. A system in accordance with claim 14 wherein said reduced information frame rate is selected to accommodate the insertion of a shortened cyclic error control code in said error correction enhanced physical transmission frame that is sufficient to achieve a predetermined number of correctable errors in a frame that is the same size as said initial information frame.

16. A system in accordance with claim 11 wherein said initial information frame has n information bits, and wherein said reduced inomion frame is selected to have k information bits such that said error correction enhanced physical transmission frame is capable of carrying n–k additional error correction bits representing a shortened cyclic error control code capable of correcting t errors in a frame of size $n'\geq n$ and $k'\geq k$, where n' is the correctable frame size and k' is the number of correctable frame information bits.

17. A system in accordance with claim 16 wherein said error correction enhanced physical transmission frame includes additional place holder bits in the event that fewer than n–k additional error correction bits are required to correct t errors in a frame of size $n'\geq n$ and $k'\geq k$.

18. A system in accordance with claim 17 wherein said error correction code is a shortened BCH code.

19. A system in accordance with claim 11 wherein said reduced rate information frame carries not more than one-half the information of said initial information frame.

20. A system in accordance with claim 11 further including means in said base station for resuming said initial information frame rate in the event the number of said frame errors falls below said predetermined threshold.

21. A method for providing a warning of and greater immunity from an impending call drop in a digital wireless communications system, comprising the steps of:

transmitting data at an initial information frame rate and a corresponding initial physic frame rate; and upon said data transmission producing errors in excess of a threshold, reducing said initial information frame rate to a reduced information frame rate while introducing error correction codes into said data transmission to maintain said initial physical frame rate.

22. A system for providing a warning of and greater immunity from an impending call drop in a digital wireless communications system, comprising:

means for transmitting data at an initial information frame rate and a corresponding initial physical frame rate; and means responsive to data transmission errors in excess of a threshold for reducing said initial information frame rate to a reduced information frame rate while introducing error correction codes into said data transmission to maintain said initial physical frame rate.

* * * * *